US008805692B2

(12) United States Patent
Goldstein (10) Patent No.: US 8,805,692 B2
(45) Date of Patent: Aug. 12, 2014

(54) PERSONAL AUDIO ASSISTANT DEVICE AND METHOD

(71) Applicant: Personics Holdings, Inc., Boca Raton, FL (US)

(72) Inventor: Steven Wayne Goldstein, Delray Beach, FL (US)

(73) Assignee: Personics Holdings, LLC, Boca Raton, FL (US)

( * ) Notice: Subject to any disclaimer, the term of this patent is extended or adjusted under 35 U.S.C. 154(b) by 0 days.

(21) Appl. No.: 14/148,752

(22) Filed: Jan. 7, 2014

(65) Prior Publication Data

US 2014/0129229 A1    May 8, 2014

Related U.S. Application Data

(63) Continuation of application No. 11/774,965, filed on Jul. 9, 2007.

(60) Provisional application No. 60/806,769, filed on Jul. 8, 2006.

(51) Int. Cl.
*G10L 15/00* (2013.01)

(52) U.S. Cl.
USPC .......................... 704/275; 704/270; 455/575.2

(58) Field of Classification Search
USPC ................................ 704/270, 275; 455/575.2
See application file for complete search history.

(56) References Cited

U.S. PATENT DOCUMENTS

| 3,865,998 | A | 2/1975 | Weiss et al. |
|---|---|---|---|
| 4,539,439 | A | 9/1985 | Strothmann et al. |
| 5,694,475 | A | 12/1997 | Boyden |
| 5,751,820 | A | 5/1998 | Taenzer |
| 6,379,314 | B1 | 4/2002 | Horn |
| 6,661,901 | B1 | 12/2003 | Svean et al. |
| 6,840,908 | B2 | 1/2005 | Edwards et al. |
| 6,965,770 | B2 | 11/2005 | Walsh et al. |
| 7,149,319 | B2 | 12/2006 | Roeck |
| 7,206,429 | B1 | 4/2007 | Vossler |
| 7,546,144 | B2 | 6/2009 | de Leon et al. |
| 7,558,529 | B2 | 7/2009 | Seshadri et al. |
| 8,260,618 | B2 * | 9/2012 | Mahlbacher .................. 704/275 |
| 2003/0069854 | A1 | 4/2003 | Hsu et al. |
| 2003/0130852 | A1 * | 7/2003 | Tanaka et al. ................. 704/275 |

(Continued)

FOREIGN PATENT DOCUMENTS

WO    WO0124576    4/2001

OTHER PUBLICATIONS

Elias Pampalk, Tim Pohle, and Gerhard Widmer, "Dynamic Playlist Generation Based on Skipping Behavior", Published in: Proc. of the 6th International Society for Music Information Retrieval (ISMIR) Conference, 2005.

Provisional Patent Application for U.S. Appl. No. 60/805,985, filed Jun. 28, 2006.

(Continued)

*Primary Examiner* — Daniel D Abebe
(74) *Attorney, Agent, or Firm* — Pablo Meles (57) ABSTRACT

A wearable device includes a housing for the wearable device, a first microphone within or on the housing, a communication module within or on the housing, a logic circuit communicatively coupled to the first microphone, a memory storage unit communicatively coupled to the logic circuit and an interaction element. The interaction element and logic circuit cooperatively initiate control of media content or initiate operations of the wearable device. Other embodiments are disclosed.

20 Claims, 5 Drawing Sheets

(56) References Cited

U.S. PATENT DOCUMENTS

2005/0078843 A1    4/2005   Bauman
2005/0251224 A1   11/2005   Berg
2007/0025194 A1    2/2007   Morse et al.
2007/0079692 A1    4/2007   Glatt
2007/0165875 A1*   7/2007   Rezvani et al. ............... 381/74
2010/0311390 A9*  12/2010   Black et al. ................... 455/410
2013/0289986 A1*  10/2013   Graylin ......................... 704/235

OTHER PUBLICATIONS

Zotkin et al., "Creation of Virtual Auditory Spaces", Acoustics Speech and Signal Processing (ICASSP), May 2002.

Begault et al., "Direct Comparison of the Impact of Head Tracking, Reverberation, and Individualized Head-Related Transfer Functions on the Spatial Perception of a Virtual Speech Source", J. Audio Eng. Soc., vol. 49, No. 10, Oct. 2001.

* cited by examiner

PERSONAL AUDIO ASSISTANT DEVICE AND METHOD

CROSS-REFERENCE TO RELATED APPLICATIONS

This application claims the priority benefit of U.S. Provisional Application No. 60/806,769, under 35 U.S.C. §119(e), filed 8 Jul. 2006, and U.S. Non-Provisional application Ser. No. 11/774,965 filed 9 Jul. 2007, both of which are incorporated herein by reference in their entireties.

FIELD

The claimed embodiments relate in general to methods and devices for the storage and recall of audio content via an earpiece, and in particular, though not exclusively, for the storage and playing of music or verbal content on a system that is built into a headphone.

BACKGROUND

Present audio content playing devices are separated from the headphone system that normally contains the speakers (also referred to as receivers). The reason for this has typically been that audio content has been stored on disks that require a separate playing system. However, even with the advent of storing audio content on non-disk RAM (Random Access Memory) storage systems, the audio content player has been separated from the earpiece system (e.g., plug in headphones or earbuds). Combining the capacity for audio download and playing in an earpiece system is not obvious over related art since the user interaction system (e.g., play button, keyboard system) does not readily appear compatible with the size of an earpiece device and the difficulty of user interaction.

Additionally, no system currently exists for registration and download of audio content into an earpiece.

BRIEF DESCRIPTION OF THE DRAWINGS

Examples of the claimed embodiments will become apparent from the following detailed description, taken in conjunction with the drawings in which:

DETAILED DESCRIPTION OF EXEMPLARY EMBODIMENTS

The following description of exemplary embodiment(s) is merely illustrative in nature and is in no way intended to limit the claimed embodiments, its application, or uses.

Processes, methods, materials and devices known by one of ordinary skill in the relevant arts can not be discussed in detail but are intended to be part of the enabling discussion where appropriate for example the generation and use of transfer functions.

Notice that similar reference numerals and letters refer to similar items in the following figures, and thus once an item is defined in one figure, it can not be discussed for following figures.

Note that herein when referring to correcting or corrections of an error (e.g., noise), a reduction of the error and/or a correction of the error is intended.

SUMMARY OF EXEMPLARY EMBODIMENTS

At least one exemplary embodiment is directed to a system for Personalized Services delivered to a Personal Audio Assistant incorporated within an earpiece (e.g., earbuds, headphones). Personalized Services include content such as music files (for preview or purchase) related to a user's preferences, reminders from personal scheduling software, delivery and text-to-speech, speech-to-text processing of email, marketing messages, delivery and text-to-speech of stock market information, medication reminders, foreign language instruction, academic instruction, time and date information, speech-to-speech delivery, instructions from a GPS system and others. A Personal Audio Assistant can be an audio playback platform for providing the user with Personalized Services.

At least one exemplary embodiment is directed to a Personal Audio Assistant system that is included as part of an earpiece (e.g., Headphone system). The Personal Audio Assistant is capable of digital audio playback, mitigating the need to carry a personal music player. Furthermore, a subscription-based service provides audio content to the user through the Personal Audio Assistant. The type of audio content, which is automatically provided to the user, is based on the user's preferences, which are obtained through a registration process.

The audio content, which is seamlessly downloaded to the Personal Audio Assistant in the background, is managed from a Server system and is only available on the Personal Audio Assistant for a predetermined period of time or for a fixed number of playback counts. However, the user can purchase any music file or electronic book directly from the Personal Audio Assistant with a simple one-click control interface, storing the purchased audio content on the Personal Audio Assistant as well as storing the content permanently in a user storage lock-box location on the Server system.

The system provides for audio content to be new and "fresh" each time the user auditions the content. As such, the content is typically auditioned in a first-in: first-out scenario. In one such example, the user has turned on the Personal Audio Assistant at 8:00 am and by 10:00 am has auditioned 2 hours of content that were created for the user as a manifestation of the user's choices of their preferences of genre, artist, their demographics, day of the week, time of day and purchase history. The system also provides for the elimination of a particular song or playlist in situ.

As the user's Listening History Envelope is updated based on experience, subsequent downloads will only contain content incorporating these revised preferences. The Personal Audio Assistant provides for ample memory, thus permitting hours of uninterrupted playback without the need to download additional content from the server. When in need, the Personal Audio Assistant automatically interrogates various communication platforms as it searches for connections.

Once a connection is made, the Listener History Envelope file is uploaded to the server, and a new set of personalized playlist content is downloaded to the Personal Audio Assistant. Accordingly, as the Personal Audio Assistant content is auditioned and thus depleted, the communications system provides for constant replenishment.

In another embodiment, the Personal Audio Assistant also provides for a new set of business solutions to be offered to the music industry. As the personalized audio content is only available for audition for a limited period of time, and can not be sent to the user again from for weeks to months, the user's purchasing behavior can be demonstrated as spontaneous. The basic model of "Try before you buy" is the expected outcome. In another iteration, the distributor of the music can choose to offer discounts, which can be time-sensitive or quantity-sensitive in nature, in effect promoting greater purchase activity from the user.

In another iteration, while in audition a user can wish to place the desired content in a hold status. The hold status forms the basis of a "wish list," thus allowing the user to hold for future consideration audio content while it is being auditioned. This content resides in the memory of the Personal Audio Assistant for a defined period, and is automatically erased, or the user can do so manually. The selected content will also appear on the user's computer via a URL address; here it resides on the server ready for audition or purchase and download.

The system is designed to operate as simply as possible. Using a single button, which has multiple contacts, the interface allows the user to purchase, delete, skip to next, and add to a wish list and even control a listening level.

In another iteration, the user can download their own music to the Personal Audio Assistant for audition. The Personal Audio Assistant system is capable of text-to-speech processing and can interface with personal scheduling software to provide auditory schedule reminders for the user. Auditory reminders relating to the user's medication schedule are also generated by the system.

At least one exemplary embodiment includes input Acoustic Transducers (microphones) for capturing user's speech as well as Environmental Audio. In further embodiments, stereo input Acoustic Transducers capture Environmental Audio, and, mixing it with the audio signal path, present the ambient sound field to the user, mitigating the need to remove the Headphone apparatus for normal conversation.

Additional exemplary embodiments are directed to various scenarios for the delivery and consumption of audio content. The Personal Audio Assistant can store and play back audio content in compressed digital audio formats. In one embodiment, the storage memory of the Personal Audio Assistant is completely closed to the end-user and controlled from the Server. This allows for audio content to be distributed on a temporary basis, as part of a subscription service. In another iteration of the present embodiments, the storage memory of the Personal Audio Assistant is not completely closed to the end-user, allowing the user to transfer audio content to the Personal Audio Assistant from any capable device such as a Personal Computer or a Personal Music Player.

In at least one exemplary embodiment the Personal Audio Assistant automatically scans for other Bluetooth®-enabled audio playback systems and notifies the user that additional devices are available. These additional devices can include a Bluetooth® video system, television system, personal video player, video camera, cell phone, another Personal Audio Assistant and others.

In another iteration, the Personal Audio Assistant can be directly connected to a Terrestrial Radio receiver, or have such a receiver built in to the system.

In another exemplary embodiment, a technique known as Sonification can be used to convey statistical or other numerical information to a headphone. For example, the user would be able to receive information about the growth or decline of a particular stock, groups of stocks or even sectors of the markets though the Personal Audio Assistant. Many different components can be altered to change the user's perception of the sound, and in turn, their perception of the underlying information being portrayed. An increase or decrease in some level of share price or trading levels can be presented to the user. A stock market price can be portrayed by an increase in the frequency of a sine tone as the stock price rose, and a decline in frequency as it fell. To allow the user to determine that more than one stock was being portrayed, different timbres and spatial locations might be used for the different stocks, or they can be played to the user from different points in space, for example, through different sides of their headphones. The user can act upon this auditory information and use the controls built-in to the headphone to either purchase or sell a particular stock position.

Furthermore, specific sonification techniques and preferences can be presented to the user as "themes" from which the user can select. For example, one theme might auralize the current trading price of one stock with an ambient sine tone in the left ear, the price of another stock in the right ear, their respective trade volumes as perceived elevation using personalized head-related transfer function binauralization, and the current global index or other market indicator as the combined perceptual loudness of both tones. Such a scheme affords ambient auditory display in this example of five dimensions of financial data without compromising the user's ability to converse or work on other tasks. In another embodiment, the system affords users the ability to customize themes to their liking and to rapidly switch among them using simple speech commands. Additionally, the user can search the web from voice commands and receive results via a text to speech synthesizer.

In yet another exemplary embodiment the Personal Audio Assistant (PAA) functions as a dictation device for medical professionals for dictating clinical information to a patient's medical record, or write prescriptions for medication or devices. Conversely, the PAA can function as text-to-speech allowing the clinician to audition information from a medical record, rather than reading. The PAA can save considerable time preparing clinician interaction with a patient.

In another iteration, the Personal Audio Assistant can function as a tool to locate other users of Personal Audio Assistant who share common interests, or who are searching for particular attributes of other users. Whereas the first user has stored specific personal information in the Public Data memory of the Personal Audio Assistant, an example of which might be related to schools attended, marital status, profession etc, or the first user can be in search of another user with these attributes and whereas a second user of a Personal Audio Assistant comes within communication range of the first user, the individual Personal Audio Assistants communicate with each other, access the personal information stored in each of their respective Public Data memories to ascertain if these users have common interests. If a match occurs, each unit can contain both audible and visual indicators announcing that a match has been made and thus each user can start dialog either physically or electronically via the environmental microphones.

EXAMPLES OF TERMINOLOGY

Note that the following non-limiting examples of terminology are solely intended to aid in understanding various exemplary embodiments and are not intended to be restrictive of the meaning of terms nor all inclusive.

Acoustic Isolation Cushion: An "Acoustic Isolation Cushion" shall be defined as a circum-aural or intra-aural device that provides acoustic isolation from Environmental Noise. Acoustic Isolation Cushions can be included as part of a Headphones system, allowing the output of the acoustical transducers to reach the ear unimpeded, but still providing acoustic isolation from Environmental Noise.

Acoustic Transducer: An "Acoustic Transducer" shall be defined as a device that converts sound pressure level variations into electronic voltages or vice versa. Acoustic Transducers include microphones, loudspeakers, Headphones, and other devices.

Audio Playback: "Audio Playback" shall be defined as the auditory stimuli generated when Playback Hardware reproduces audio content (music, speech, etc) for a listener or a group of listeners listening to Headphones.

Audition: "Audition" shall be defined as the process of detecting sound stimulus using the human auditory system. This includes the physical, psychophysical, psychoacoustic, and cognitive processes associated with the perception of acoustic stimuli.

Client: A "Client" shall be defined as a system that communicates with a Server, usually over a communications network, and directly interfaces with a user. Examples of Client systems include personal computers and mobile phones.

Communications Port: A Communication Port shall be defined as an interface port supporting bidirectional transmission protocols (TCP/IP, USB, IEEE 1394, IEEE 802.11, Bluetooth®, A2DP, GSM, CDMA, or others) via a communications network (e.g., the Internet, cellular networks).

Control Data: "Control Data" shall be defined as information that dictates the operating parameters for a system or a set of systems.

Earcon: An Earcon shall be defined as a Personalized Audio signal that informs the User of a pending event typically inserted in advance of the upcoming audio content.

Ear Mold Style: "Ear Mold Style" shall be defined as a description of the form factor for an intra-aural device (e.g., hearing aids). Ear Mold Styles include completely in the canal (CIC), in the canal (ITC), in the ear (ITE), and behind the ear (BTE).

Environmental Audio: "Environmental Audio" shall be defined as auditory stimuli of interest to the user in the environment where the user is present. Environmental Audio includes speech and music in the environment.

Environmental Noise: "Environmental Noise" shall be defined as the auditory stimuli inherent to a particular environment where the user is present and which the user does not wish to audition. The drone of highway traffic is a common example of Environmental Noise. Note that Environmental Noise and Audio Playback are two distinct types of auditory stimuli. Environmental Noise does not typically include Music or other audio content.

E-Tailing System: An "E-tailing System" shall be defined as a web-based solution through which a user can search, preview and acquire some available product or service. Short for "electronic retailing," E-tailing is the offering of retail goods or services on the Internet. Used in Internet discussions as early as 1995, the term E-tailing seems an almost inevitable addition to e-mail, e-business, and e-commerce. E-tailing is synonymous with business-to-consumer (B2C) transactions. Accordingly, the user can be required to register by submitting personal information, and the user can be required to provide payment in the form of Currency or other consideration in exchange for the product or service. Optionally, a sponsor can bear the cost of compensating the E-tailer, while the user would receive the product or service.

Generic HRTF: A "Generic HRTF" shall be defined as a set of HRTF data that is intended for use by any Member. A Generic HRTF can provide a generalized model of the parts of the human anatomy relevant to audition and localization, or simply a model of the anatomy of an individual other than the Member. The application of Generic HRTF data to Audio Content provides the least convincing Spatial Image for the Member, relative to Semi-Personalized and Personalized HRTF data. Generic HRTF data is generally retrieved from publicly available databases such as the CIPIC HRTF database.

Headphones: "Headphones" (also known as earphones, earbuds, stereophones, headsets, Canalphones, or the slang term "cans") are a pair of transducers that receive an electrical signal from a media player, communication receivers and transceivers, and use speakers placed in close proximity to the ears (hence the name earphone) to convert the signal into audible sound waves. Headphones are intended as personal listening devices that are placed either circum-aural or intra-aural according to one of the Ear Mold Styles, as well as other devices that meet the above definition such as advanced eyewear that includes Acoustical Transducers (i.e. Dataview). Headphones can also include stereo input Acoustic Transducers (microphones) included as part of the Ear Mold Style form factor.

HRTF: "HRTF" is an acronym for head-related transfer function—a set of data that describes the acoustical reflection characteristics of an individual's anatomy relevant to audition. Although in practice they are distinct (but directly related), this definition of HRTF encompasses the head-related impulse response (HRIR) or any other set of data that describes some aspects of an individual's anatomy relevant to audition.

Informed Consent: "Informed Consent" shall be defined as a legal condition whereby a person can provide formal consent based upon an appreciation and understanding of the facts and implications associated with a specific action. For minors or individuals without complete possession of their faculties, Informed Consent includes the formal consent of a parent or guardian.

Listening History Envelope: "Listening History Envelope" shall be defined as a record of a user's listening habits over time. The envelope includes system data, time system was turned off, time the system is presenting content, when the system doesn't audition, system transducers, when the user auditions content, time stamp of content being auditioned, content which is: skipped, deleted, played multiple times, saved in the Wish List, and time between listening sessions.

Music: "Music" shall be defined as a form of expression in the medium of time using the structures of tones and silence to create complex forms in time through construction of patterns and combinations of natural stimuli, principally sound. Music can also be referred to as audio media or audio content.

Playback Hardware: Any device used to play previously recorded or live streaming audio. Playback Hardware includes Headphones, loudspeakers, personal music players, mobile phones, and other devices.

Personal Audio Assistant: A "Personal Audio Assistant" shall be defined as a portable system capable of interfacing with a communications network, directly or through an intermediate, to transmit and receive audio signals and other data.

Personal Computer: "Personal Computer" shall be defined as any piece of hardware that is an open system capable of compiling, linking, and executing a programming language (such as C/C++, Java™, etc.).

Personal Music Player: "Personal Music Player" shall be defined as any portable device that implements perceptual audio decoder technology but is a closed system in that users are not generally allowed or able to write software for the device.

Personalized HRTF: A "Personalized HRTF" shall be defined as a set of HRTF data that is measured for a specific Member and unique to that Member. The application of Personalized HRTF data to Audio Content creates, by far, the most convincing Spatial Image for the Member (Begault et. al. 2001, D. Zotkin, R. Duraiswami, and L. Davis 2002).

Personalized Services: "Personalized Services" shall be defined as services customized to better meet the needs of an individual. Personalized Services include media content (for preview or purchase) related to a user's preferences, reminders from personal scheduling software, delivery and text-to-speech processing of email, marketing messages, delivery and text-to-speech of stock market information, medication reminders, foreign language instruction [real-time foreign language translation], academic instruction, time and date information, and others.

Public Data: "Public Data" shall be defined as data which contains specific and personal information about the registered user of the Personal Audio Assistant. The registered user chooses which portions of their complete Registration Process data they wish to include in this subset. This data becomes distributed to other users who have compliant devices thus allowing other users to know specific details of the registered user.

Registration Process: "Registration Process" includes the acquisition of the user's preference via a web page. Typically, the process would include the items to be captured: Age, demographics, email, gender, Relative Audiogram, Personal Preferences, banking information, credit card information, wake-up and sleep times, music preferences by genre, artist, preferences for writers and authors, desire to receive advertising, turn-on listening level, equalization, email preferences, parental control setup as well as other user-controlled settings.

Relative Audiogram: A "Relative Audiogram" shall be defined as a measured set of data describing a specific individual's hearing threshold level as a function of frequency. A Relative Audiogram is only an approximate Audiogram, leaving more complete Audiogram analysis to qualified audiologists.

Semi-Personalized HRTF: A "Semi-Personalized HRTF" shall be defined as a set of HRTF data that is selected from a database of known HRTF data as the "best-fit" for a specific user. Semi-Personalized HRTF data is not necessarily unique to one user; however, interpolation and matching algorithms can be employed to modify HRTF data from the database to improve the accuracy of a Semi-Personalized HRTF. The application of Semi-Personalized HRTF data to Audio Content provides a Spatial Image that is improved compared to that of Generic HRTF data, but less effective than that of Personalized HRTF data. The embodiments within speak to a variety of methods for determining the best-fit HRTF data for a particular Member including anthropometrical measurements extracted from photographs and deduction.

Server: A "Server" shall be defined as a system that controls centrally held data and communicates with Clients.

Sonification: "Sonification" shall be defined as the use of non-speech audio to convey information or to aurally perceptualize non-acoustic data (auralize). Due to a variety of phenomena involving human cognition, certain types of information can be better or more efficiently conveyed using auditory means than, for example, visual means.

Exemplary Embodiments

Figure 1:
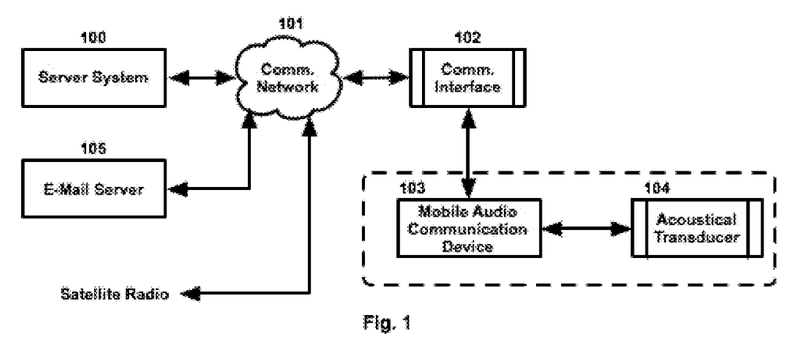
FIG. 1 illustrates the connection between an earpiece device (103 and 104) and a communication network.

FIG. 1 illustrates the connection between an earpiece device (103 and 104) and a communication network (101) via communication interface 102, which can be operatively connected (via a wired or wireless connection) to a server system (100) and/or an e-mail server (105). Additionally a radio signal (e.g., satellite radio) can be input into the earpiece 500 (FIG. 5B) via a communication module (e.g., Bluetooth® wireless module 515).

Figure 2:
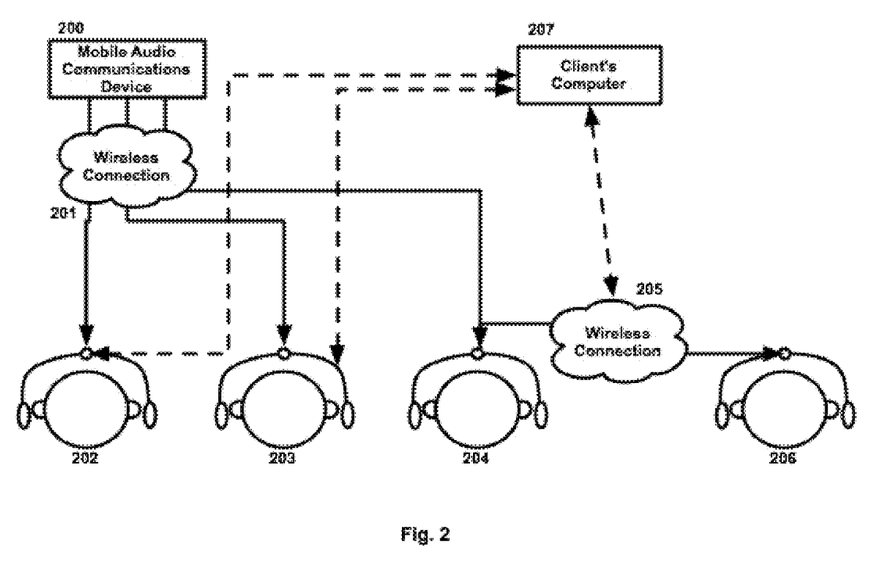
FIG. 2 illustrates at least one exemplary embodiment where earpiece devices share information with other earpiece devices within range (e.g., GPS location and identity)

FIG. 2 illustrates at least one exemplary embodiment where earpiece devices share information with other earpiece devices within range (e.g., GPS location and identity). For example multiple users (e.g., 202, 203, 204, and 206) can send signals to each individual earpiece (e.g., 500) when in range (e.g., via a wireless connection 205) or to a mobile audio communications device 200 via a wireless connection (201) with each earpiece (500). Additionally information (e.g., audio content, software download) can be sent via a client's computer 207 to each earpiece, either directly (e.g., 205), or via 200. For example audio content can be retrieved on a user's computer and sent to the earpieces that have authorization to use it.

Figure 3:
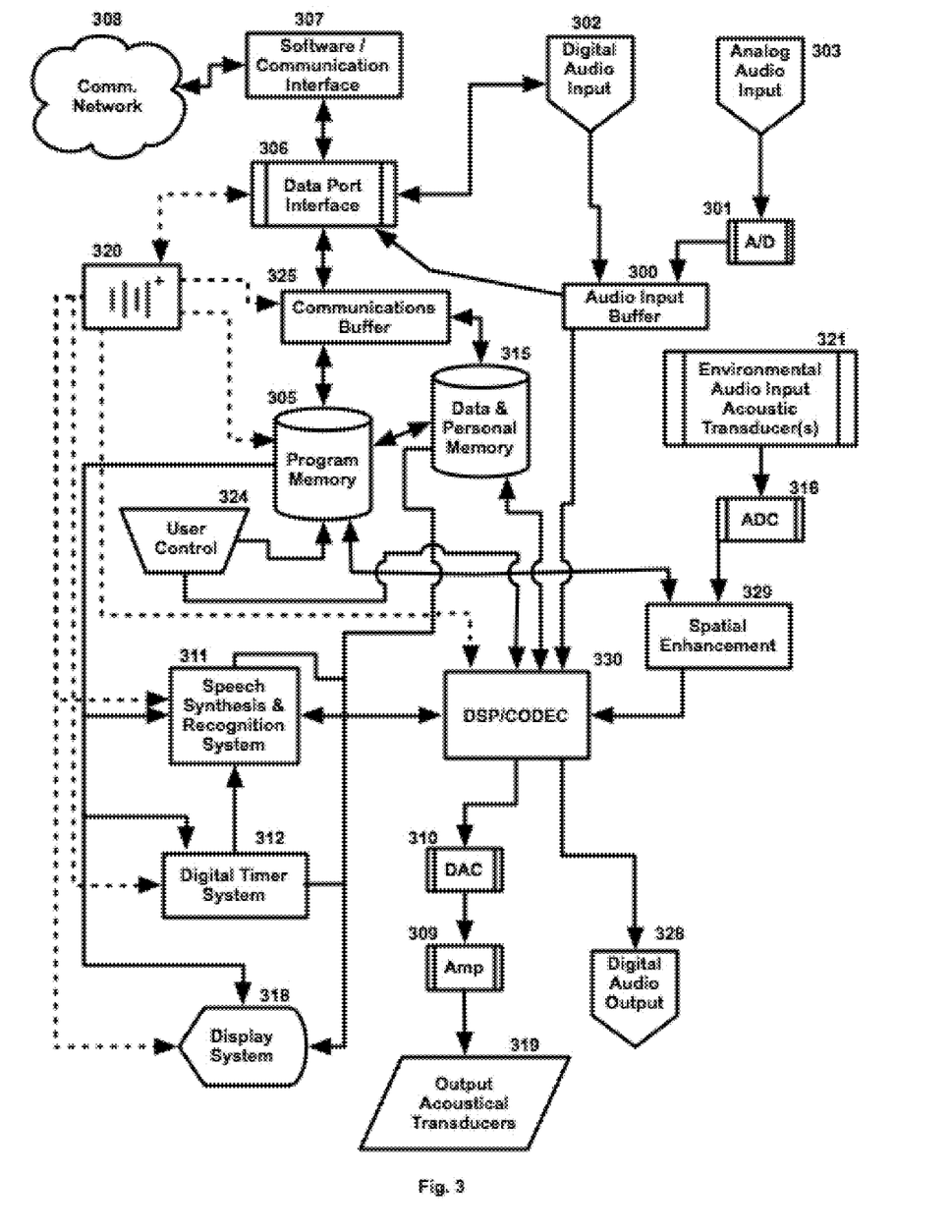
FIG. 3 illustrates an example of various elements that can be part of an earpiece device in accordance with at least one exemplary embodiment.

FIG. 3 illustrates an example of various elements that can be part of an earpiece device in accordance with at least one exemplary embodiment. The earpiece can include all or some of the elements illustrated in FIG. 5B. For example the logic circuit 572 or the operatively connected memory storage device 585, can include spatial enhancement software 329, a DSP codec 330, a speech synthesis and recognition system 311, and a digital timer system 312. Additional elements can be connected to the logic circuit 572 as needed, for example a power supply 320, a software communication interface 307 (e.g., wireless module 515) (which may be connected to communication network 308), data port interface 306, audio input buffers 300 connected to digital audio input 302 and/or analog audio input 303 converted to digital via an ADC 301, environmental audio input acoustic transducer(s) 321 converted to digital via an ADC 316, user control 324, digital audio output 328, output acoustic transducers 319 (which receive signals converted to analog via a DAC 310 and amplified via amplifier 309), display system 318, communication buffers 325, program memory 305, data and personal memory 315, as well as other electronic devices as known by one of ordinary skill in the relevant arts.

Figure 4:
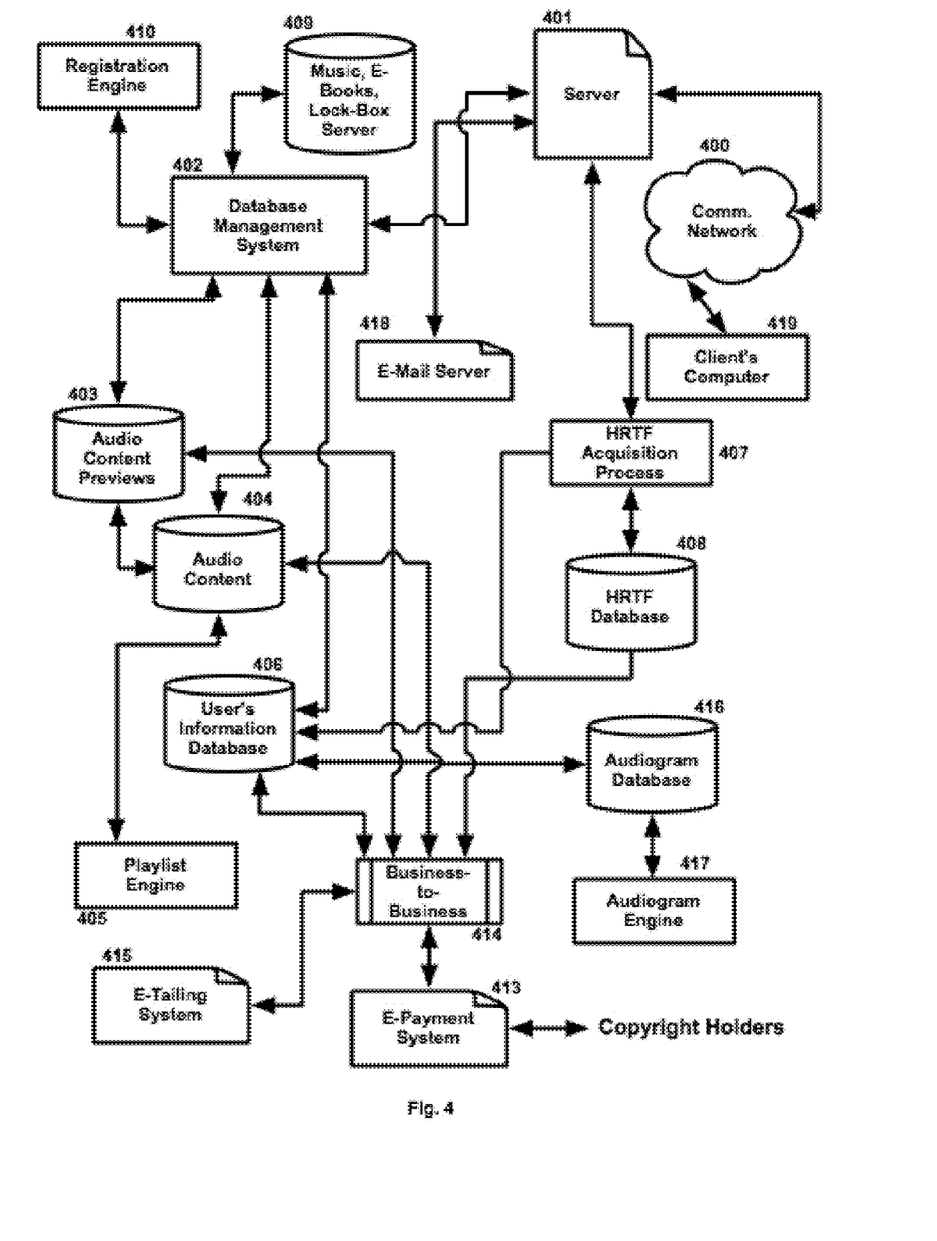
FIG. 4 illustrates an example of a communication system in accordance with at least one exemplary embodiment that a user can use to register via his/her computer.

FIG. 4 illustrates an example of a communication system in accordance with at least one exemplary embodiment that a user can use to register via his/her computer 419, via a communication network 400 (e.g., Internet connection) connected to many various database and registration systems as illustrated and labeled in FIG. 4. For example, server 401, database management system 402, audio content preview database 403, audio content database 404, playlist engine 405, user's information database 406, HRTF acquisition process module 407, HRTF database 408, lock-box server 409, registration engine 410, e-payment system 413, business-to-business module 414, e-tailing system 415, audiogram database 416, audiogram engine 417 and/or e-mail server 418.

Figure 5A:
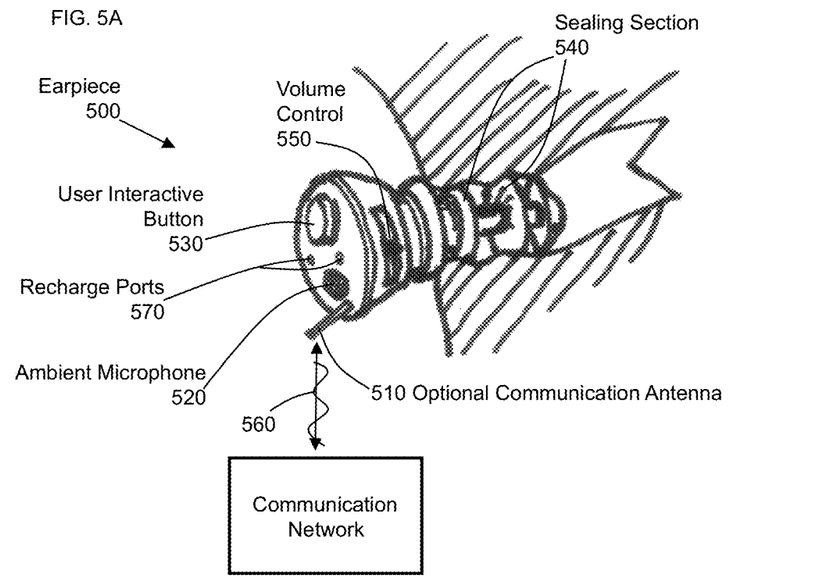
FIG. 5A illustrates an earpiece that can store and download audio content in accordance with at least one exemplary embodiment.

FIG. 5A illustrates an earpiece 500 having sealing section 540 in an ear canal that can store and download audio content 560 in accordance with at least one exemplary embodiment. The earpiece 500, can include a first user interaction element 530 (e.g., a button), that can be used to turn the earpiece 500 on, or if on then activate an audio play command to start playing saved audio content. The earpiece 500 can also include a second user interaction element 550 (e.g., a slide control) that can be used for example to control the volume. The earpiece 500 can also include recharge ports 570, that can accept two wires of varying voltage that can be inserted into the recharge ports 570 to recharge any batteries in the earpiece 500. The earpiece 500 can include an ambient microphone 520 and an optional communication antenna 510, that if needed can aid in the communication between the earpiece 500 and a communication network.

Figure 5B:
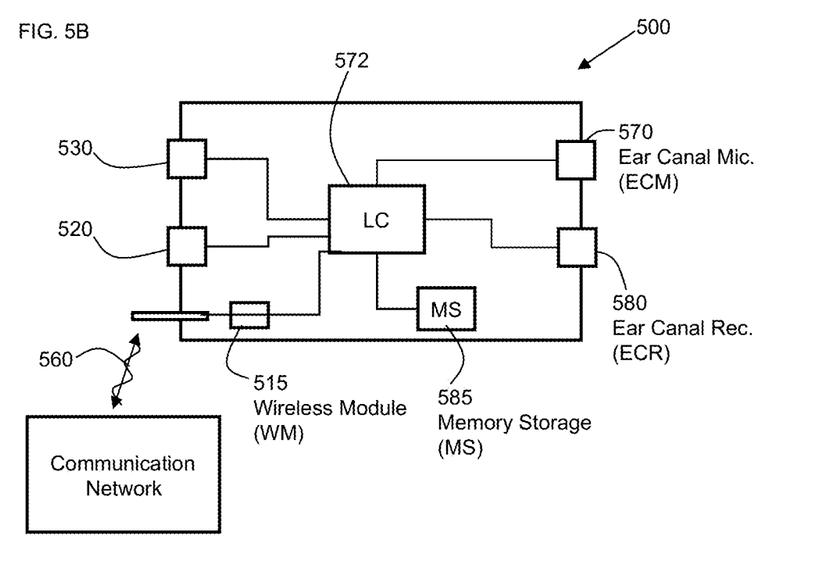
FIG. 5B illustrates a block diagram of the earpiece of FIG. 5A.

FIG. 5B illustrates a block diagram of the earpiece of FIG. 5A, illustrating the first user interaction element 530, the ambient microphone (AM) 520, that can be used to pick up ambient audio content, an ear canal microphone (ECM) 590 that can pick up audio in the ear canal region, an ear canal receiver (ECR) 580 that can direct audio content to the ear drum, all of which can be connected operatively to a logic circuit 572. A memory storage device 585 can be operatively connected to the logic circuit (LC) 572, and can store data such as registration, preference, and audio content data. The optional communication antenna 510 can be connected to a communication module (e.g., wireless module 515), and can receive or transmit information 560 to a communication network.

Figure 6:
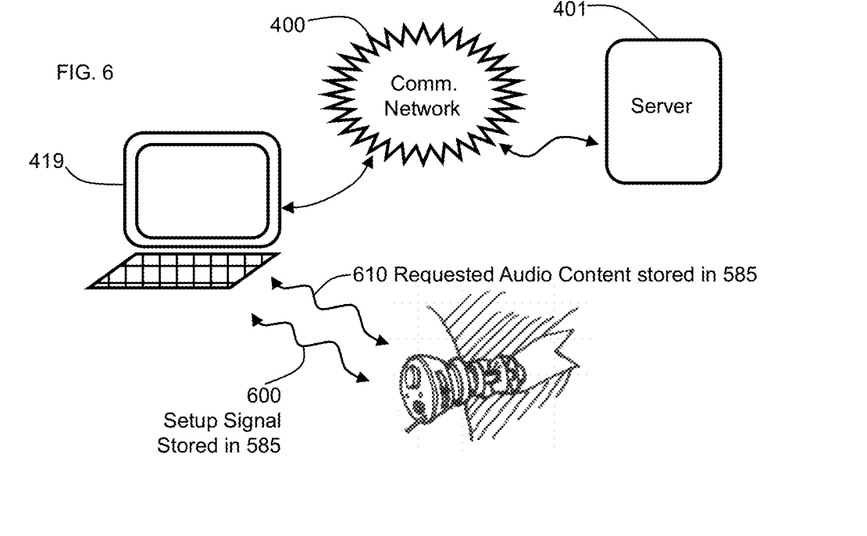
FIG. 6 illustrates a user interface for setting the parameters of the Personal Audio Assistant.

FIG. 6 illustrates a user interface for setting the parameters stored in the memory storage device 585. For example a user can use his/her computer 419 to communicate with a server 401 (e.g., via a communication network 400) to start the user's registration (e.g., with an audio content provider). The registration information can then be transmitted 600 to set the stored parameters in the memory storage device 585 of the earpiece 500. Additionally a requested (e.g., bought) audio content can be downloaded 610 into the memory storage device 585 of the earpiece 500.

At least one exemplary embodiment is directed to an earpiece comprising: an ambient microphone; an ear canal microphone; an ear canal receiver; a sealing section; a logic circuit; a communication module; a memory storage unit; and a user interaction element, where the user interaction element is configured to send a play command to the logic circuit when activated by a user where the logic circuit reads registration parameters stored on the memory storage unit and sends audio content to the ear canal receiver according to the registration parameters.

In at least one exemplary embodiment the audio content is stored in the memory storage unit. The earpiece according to claim 2, where the communications module is a wireless communications module. Additionally the earpiece can include a second user interaction element configured to alter the volume of the audio content that is emitted from the ear canal receiver.

Upon a play command being received by the logic circuit the logic circuit can check registration parameters stored in the memory storage device for example one of the registration parameters can be whether the audio content is a sample audio content or a fully purchased audio content, or the allowed number of times an audio content can be played, and a counter value that keeps track of the number of times the audio content has been played.

The earpiece can send an auditory warning to be emitted by the ear canal receiver when the counter value is greater than or equal to the allowed number of times the audio content can be played, and where the logic circuit does not send the audio content to the ear canal receiver.

Further Exemplary Embodiments

At least one exemplary embodiment is directed to a system for the delivery of Personalized Services to Personal Audio Assistants, the system comprising: a Personal Audio Assistant system for presenting Personalized Services to the user as Audio Playback; a Server system for user registration, Personalized Service management, and communication; a Registration Process for collecting detailed registration information from users, including the information necessary for creating Personalized Services; a communications protocol (TCP/IP, USB, IEEE 1394, IEEE 802.11, Bluetooth®, A2DP, GSM, CDMA, or other) and a communications network (i.e. the Internet, cellular networks) connecting the Personal Audio Assistant to the Server or connecting the Personal Audio Assistant to other Personal Audio Assistants (peer-to-peer behavior).

In at least one exemplary embodiment a Personal Computer acts as an intermediate, connecting to the Server system over a communications network and connecting to the Personal Audio Assistant over a local connection. At least one exemplary embodiment includes a Personal Hearing Damage Intervention System (e.g., USPTO—60/805,985—Goldstein).

In at least one exemplary embodiment a Personal Audio Assistant system included as part of a Headphone system, the system comprising: a Communications Port supporting a communications protocol enabling communication with the Server system, peer devices, and other capable devices; a non-volatile program memory storage system for storing Control Data, dictating system behavior; a data memory storage system for storing data and audio content; an analog audio input/output and corresponding ADC/DAC; a digital audio input/output and a digital audio signal path; a user control system allowing the user to adjust the level of the audio output and control the behavior of the system; a user control system allowing the user to purchase the content being auditioned in real time; a user control system allowing the user to control, delete, fast forward, output level control, scan, advance, the data stored both stored in memory as well as new streaming data emails and reminders; a display system for presenting information to the user(s) visually using any method familiar to those skilled in the art (LED, LCD, or other); a display system for presenting information to the user(s) (e.g., using Earcons and other sound files); a speech synthesis system for converting text-to-speech and generating speech signals; a speech recognition system for converting speech to-text to respond and send emails and to interface with the control language as to provide navigational commands; a digital timer system; a power supply system in the form of a battery; a unique identification number for each Personal Audio Assistant; Input Acoustic Transducers; an Output Acoustic Transducer; an Audio amplification system; Acoustic Isolation Cushions conforming to one of the Ear Mold Styles (CIC, ITC, ITE, or BTE; see definitions) and other elements common to Headphone systems; a digital signal processor (DSP) system; and a CODEC processor capable of improving the perceptual sound quality of the content to be auditioned while governed by delivering the correct SPL dose.

In at least one exemplary embodiment the system is independent of a Headphone array or can be included and imbedded as part of a Personal Computer system, a Personal Music Player system, a personal monitoring system, an automotive audio system, a home audio system, an avionics audio system, a personal video system, a mobile cell phone system, a personal digital assistant system, a standalone accessory, or an advanced eye-wear system with acoustical transducers.

In at least one exemplary embodiment the various processing needed to derive the intended functions are distributed among any combination of a Server system, a Personal Computer system, a Personal Music Player system, a personal monitoring system, an automotive audio system, a home audio system, an avionics audio system, a personal video system, a mobile cell phone system, a personal digital assistant system, a standalone accessory, or an advanced eye-wear system with acoustical transducers.

In at least one exemplary embodiment the Personal Audio Assistant system can exchange audio signals with a mobile phone via the Communications Port, allowing the Personal Audio Assistant to function as a mobile phone accessory.

In at least one exemplary embodiment a communications buffer is included. For example when a network connection is available, the communications buffer uploads stored content (e.g., Listening Habits Envelope) and stores incoming transmissions (e.g., music, electronic books, and updates to the firmware or operating system) from the Communications Port; The contents of the communications buffer are then transmitted whenever a network connection becomes available. At least one exemplary embodiment includes a perceptual audio codec decoding technology in the DSP, enabling the storage and playback of compressed digital audio formats (e.g., MP3, AAC, FLAG, etc.). At least one exemplary embodiment is compliant and compatible with DRM, FairPlay® and other forms of digital content governance.

At least one exemplary embodiment includes a user control system for selecting and playing back audio content stored in memory that operates using any combination of the following methods: a button or tactile interface which upon auditioning a song can be pressed to order content; a button, tactile and/or voice controlled interface which, when pressed once, commanded to, activates playback of short audio clips or audio thumbnails of the audio content stored in memory; When the button is pressed again during audio thumbnail playback, the current audio content selection is played in its entirety; The behavior of this interface is similar to the "scan" button interface common in FM/AM radio devices; a button, tactile and/or voice controlled interface that, when pressed or commanded to, skips to the next piece of audio content, which is selected randomly from all available audio content that has a play count equal to or less than the play count of the piece of audio content currently playing; The behavior of this interface is similar to the "shuffle" behavior found in some personal music players; an interface for browsing audio content storage devices familiar to those skilled in the art; and a process to allow for increased data memory storage capacity for storing audio content.

In at least one exemplary embodiment the contents of the data memory are encrypted and controlled by the Server system only, prohibiting the end-user from loading unauthorized audio content into the data memory. Further the contents of the data memory can be manipulated by the end-user, allowing the user to transfer audio content to the Personal Audio Assistant system from any device capable of interfacing with the communications port; For example, audio content can be transferred to the system from a Personal Music Player or a Personal Computer. According to at least one exemplary embodiment, audio content (or other media content) updates are retrieved from the Server system any time a connection is detected by the communications port. Furthermore, an exemplary embodiment can include an acoustical and/or visual indicator informing the user when a transfer of data is activated.

In at least one exemplary embodiment radio wave transmissions are used to implement some communications protocol and the communications port acts as a radio receiver. Additionally the Personal Audio Assistant can include: interfaces with some personal scheduling software through the communications port; a speech synthesis system which generates speech-signal reminders corresponding to information from the scheduling software, where the digital timer system triggers the presentation of the speech-signal reminders at the appropriate time.

Additionally the Personal Audio Assistant can interface with an email platform through the communications port; The speech synthesis system converts the email in text to speech and provides email to the user in aural presentation format. The system further comprising: a process in the Registration engine allowing the user to optimize their personalization process of incoming emails by associating a specific Earcon with the importance of the incoming email. As such, normal priority email contains an introduction sound announcing to the user the level of importance the sender associated with their email; a speech recognition system for converting speech-to-text which interfaces with the control language as to provide navigational commands allowing the user to respond and send emails.

In at least one exemplary embodiment the communications port system makes use of some wireless communications protocol (802.11, Bluetooth®, A2DP, or other) to transmit and receive digital audio data for playback, the system further comprising: an audio codec to encode and decode digital audio transmissions; a wireless communications system (802.11, Bluetooth®, A2DP, etc.) for transmitting and receiving data (digital audio transmissions, Control Data, etc.); a method for pairing two or more Personal Audio Assistants through a wireless communications protocol to provide a secure exchange of audio content, data such as the user's Public Data; an audio warning signal or visual display system output that notifies the user anytime a compatible transmission becomes available; and a user control system enabling the user to switch between available compatible transmissions.

In at least one exemplary embodiment the system enables listeners to share digital audio transmissions, the system further comprising: a method for scanning for available digital audio transmissions within range; a user control interface for specifying digital audio transmission behavior; a method for employing the system as a relay to other compliant devices; re-broadcasting digital audio transmissions to increase wireless range. In at least one exemplary embodiment multiple systems are capable of sharing the contents of their program and data memory using the wireless communications protocol.

In at least one exemplary embodiment of the system, the input Acoustic Transducer is used to record audio content to the data memory storage system, the system further comprising: an implementation of some perceptual audio codec technology in the DSP, enabling the storage of compressed audio formats (e.g., MP3, AAC, FLAG, etc); and an increased data memory storage capacity for storing recorded audio content.

In at least one exemplary embodiment, the stereo input Acoustic Transducers are ultimately connected to the audio signal path at the DSP, allowing the user to audition Environmental Audio (e.g., speech or music) and mitigating the need for the user to remove the Headphone apparatus to audition Environmental Audio, the system further comprising: a stereo pair of input Acoustic Transducers placed close to the user's ear canal input, conforming to one of the Ear Mold Styles (CIC, ITC, ITE, or BTE, see definitions); and by mounting the input Acoustic Transducers in a CIC or ITC configuration, spatial-acoustic cues are preserved, creating a spatially-accurate Environmental Audio input signal—essentially a personal binaural recording; a method for acoustically compensating for the non-linear frequency response characteristics of the Acoustical Isolation Cushions of a given Headphone system by applying corresponding inverse filters to the Environmental Audio input signal at the DSP; With this method, the system acts as a linear-frequency-response hearing protection apparatus (e.g., USPTO—60/805,985—Goldstein).

At least one exemplary embodiment includes a system for first attenuating Audio Playback and then mixing the Environmental Audio input signals, at a louder listening level, with the audio signal path using the DSP, where the system is activated by any combination of the following methods: a manual switch to activate/deactivate the system; a speech-detection apparatus to activate the system when speech is detected as the principal component of the Environmental Audio input; and a music-detection apparatus to activate the system when music is detected as the principal component of the Environmental Audio input.

At least one exemplary embodiment can include active noise reduction, echo cancellation and signal conditioning that can be environmentally customized through the registration process to better meet the user's specific needs (i.e., occupation-related noise cancellation); A typical application would be a special set of noise cancellation parameters tuned to the drilling equipment used by a dentist.

In at least one exemplary embodiment the input Acoustic Transducers are instead mounted within circum-aural, intra-aural BTE, or intra-aural ITE molds (see Ear Mold Style), the system further comprising: a spatial audio enhancement system for supplementing the spatial-acoustic cues captured by the stereo pair of input Acoustical Transducers to provide improved spatial perception of Environmental Audio using any combination of the following methods: the application of Generic, Semi-Personalized, or Personalized HRTF data to the Environmental Audio input signal; the application of binaural enhancement algorithms, familiar to those skilled in the art, to the Environmental Audio input signals; the application of a pinna simulation algorithm to the Environmental Audio input signal; and a synthetic pinna apparatus placed just before the stereo input Acoustic Transducers.

At least one exemplary embodiment includes a Server system for the creation, Registration, management, and delivery of Personalized Services, the system comprising: a communications system for interfacing with public communication networks to exchange data with Personal Audio Assistants, a Client's computer, mobile phones, PDAs or other capable devices; a database and database management system for storing and retrieving information relating to user Registration, Personalized Services, audio content, Control Data, and other data; a Registration interface system for collecting, storing, and applying information provided by users; a method for creating Personalized Services based on user Registration information; an end-user audio content Lock-Box storage system, providing every registered user access to their purchased media content; a business-to-business interface system for acquiring audio content with record labels, copyright holders, and other businesses; an E-tailing system including an electronic transactions system enabling users to purchase content, items offered for sale or pay subscription fees electronically; an E-Payment system compensating the various copyholders upon purchase of content by user; a Playlist engine, which acquires the user's Registration information, Listening History Envelope and then creates audio playlists, which is optimized for the user preferences and further refinements; and an Email server, which distributes communications to the user and others, regarding marketing data, the status of the user weekly SPL dose, and other information.

At least one exemplary embodiment includes machine-learning techniques employed to better optimize the user's preferences relating to audio content and other media content, the system further comprising: a method for tracking the purchase history of each user, relating the purchase history to media content preferences, and using the purchase history to make media content recommendations; a method for examining a user's digital media library, stored on a Personal Computer, Personal Music Player, or Personal Audio Assistant, from the Server system, and relating media content preferences and media content recommendations to the user's digital media library; and a method for examining a user's Listening History Profile.

At least one exemplary embodiment includes a Registration system for collecting a wide variety of information from users, including information necessary for creating Personalized Services, the system comprising: a Server system; an interface system for querying the user to collect registration information including demographics (age, gender), Playback Hardware information, Headphone information, occupational information, home and work locations, medication information, music-related preferences, video-related preferences, and other information; a method for customizing Control Data based on registration information; and a method for creating Personalized Services based on registration information.

In at least one exemplary embodiment a fast HRTF acquisition process is included as part of the Registration process, the system further comprising a method for the fast acquisition of Semi-Personalized HRTF data via a deduction process, the method comprising: a database system containing indexed, clustered HRTF data sets; an auditory test signal with distinctive spatial characteristics, where two or more distinct sound source locations exist; a system for the application of potential HRTF matches to the auditory test signal; and a feedback system, allowing the user to select the best listening experience from a number of candidate listening experiences, based on the spatial quality perceived in the HRTF-processed auditory test signal.

In at least one exemplary embodiment Personalized HRTF data is measured and used instead of Semi-Personalized HRTF data, by any method familiar to those skilled in the art.

In at least one exemplary embodiment the user is provided some Personal Audio Assistant free-of-charge or at a discount, given the user agrees to a subscription service commitment to receive Personalized Services for a certain amount of time.

In at least one exemplary embodiment, as part of the Personalized Services, the user is provided with temporary audio content corresponding to the preferences indicated during the registration process; Further, the user is given the option to purchase the audio content permanently; Otherwise, the audio content is replaced with new audio content from the Server, after a predetermined amount of time or a predetermined number of playback counts, the system comprising: a Personal Audio Assistant with an enhanced user control system, enabling a registered user to purchase media content directly from the Personal Audio Assistant with a button; and a Personal Audio Assistant with an enhanced user control system, enabling a registered user to store a reference to media content that can be purchased by the user at a later time.

In at least one exemplary embodiment, video or gaming content is included as well as audio content, the system further comprising: a Personal Audio Assistant with an enhanced visual display system, capable of playing video and/or gaming content.

In at least one exemplary embodiment, as part of the Personalized Services, the user receives medication reminders in the form of speech signals, audio signals, text, or graphics on the user's Personal Audio Assistant; Medication reminders are generated by the Server system based on the user's registration information.

In at least one exemplary embodiment, as part of the Personalized Services, the user receives stock market information in the form of speech signals, audio signals, text, or graphics on the user's Personal Audio Assistant; The stock market information is selected by the Server system based on the user's registration information, the system further comprising: the user having successfully registered their Personal Audio Assistant with a brokerage firm, or other stock trading engines, the user can then purchase or sell a stock by use of a user button or a speech command.

Further in at least one exemplary embodiment, the user is able to request specific media content to be transferred temporarily or permanently to the user's Personal Audio Assistant, the system further comprising: an interface system operating on the Server allowing users to request specific media content by artist, title, genre, format, keyword search, or other methods familiar to those skilled in the art; and a media content search engine system.

In at least one exemplary embodiment a Relative Audiogram compensation filter is applied to audio signal path by the digital signal processor, the system either (e.g., USPTO—60/805,985—Goldstein): (a) Retrieves Relative Audiogram compensation information from a remote Server after a registration process (during transmission, the information can include HIPAA compliant encoding); or (b) calculates a compensation filter from Relative Audiogram information obtained by the system locally. For example U.S. Pat. No. 6,840,908—Edwards, and U.S. Pat. No. 6,379,314—Horn, discuss methods for the acquisition of an individual's Relative Audiogram.

In at least one exemplary embodiment a Satellite Radio transmitter/receiver (transceiver) is incorporated within the Headphone proper, allowing the user to at least: receive XM®, Sirius® and other broadcasts for playback over the system; select radio stations for playback over the system via the control system, the control system comprising either a single-click tactile interface or the speech-controlled circuitry; store selected portions of such broadcasts in memory for later recall and playback via the control systems; engage a novel commercial-skip feature for attenuating the playback level of suspected sales commercials broadcasts; and engage a speech-skip feature for attenuating the playback of speech (e.g., news, announcements, etc.).

At least one exemplary embodiment includes a Walkie-Talkie mode, which broadcasts input to the system's built-in microphone, whereby the user's speech can be detected by the input acoustic transducer and remotely broadcast whereat least one of the following occurs: the Walkie-Talkie mode receives input via AM/FM broadcasts (as well as digital communications protocols) from a nearby user; the Walkie-Talkie mode allows nearby users to engage in conversation with increased perceptual clarity in noisy environments (e.g., aircraft cockpits), using for example a noise-cancellation system; selectively engage and disengage the Walkie-Talkie mode using the control system; detect other users of the system within a given range; and alert the user of the system when other detected systems contain certain Public Data and contain a predefined Public Message Key (e.g., "If the detected system belongs to a single male between the ages of 25 and 30 and whose favorite sport is tennis, then broadcast the message, 'I like tennis also; would you like to have coffee?'" or "If the detected system belongs to a user who attended Princeton University, then broadcast the message, 'Go Tigers!'").

At least one exemplary embodiment can use other communications to accomplish this service rather than AM/FM; as such the system can incorporate communications transmission protocols (TCP/IP, USB, IEEE 1394, IEEE 802.11, Bluetooth®, A2DP, GSM, CDMA, or other protocols) and a communications network (i.e. the Internet, cellular networks) connecting the Personal Audio Assistant to other Personal Audio Assistants. At least one exemplary embodiment can selectively control the broadcast of public data and public message keys via the control system.

At least one exemplary embodiment includes a Sonification algorithm within the Headphone, which enables auditory display of digitally received data, including for example financial data, news, GPS data, the system further containing a variety of sonification "themes" selected during the registration process that map requested data (e.g., current average trading price of AAPL stock, the Dow Jones Industrial Index, and the Nasdaq Composite®) to corresponding audio content (e.g., the frequency of a sine tone presented in the left ear, the frequency of a sine tone presented in the right ear, and the global amplitude of both sine tones, respectively).

At least one exemplary embodiment includes an auditory display, which is synthesized by the onboard Digital Signal Processor. In at least one exemplary embodiment the auditory display is created through the digital audio signal processing effects applied to any other acoustic data the system is capable of reproducing (e.g., terrestrial radio, prepurchased audio content in the user's digital library, electronic books, etc.); For example, a sudden listening level increase in the playback level of a song to which the user was listening can be triggered by a predefined alert condition (e.g., Nasdaq Composite® has exceeded 2200 points).

At least one exemplary embodiment includes the ability to create themes using a computer program and uploading a file to the Headphone system.

At least one exemplary embodiment includes a speech recognition system for converting speech to HTML (Voice Browser), whereby the user can access the Internet, provide navigational commands, perform searches and receive results via the Headphones through a text (HTML)-speech synthesize.

Additionally, the Personal Audio Assistant can be totally incorporated with a mobile cell phone, or any portable technology which incorporates any of the following protocols, TCP/IP, USB, IEEE 1394, IEEE 802.11, Bluetooth®, A2DP, GSM, CDMA, or others known to those of ordinary skill in the arts via a communications network (e.g., the Internet, cellular networks), the system further comprising: an Acoustic Transducer constructed as part of the mobile cell phone or a series of Acoustic Transducers, which are constructed as part of mobile cell phone; a commutations path incorporated into the mobile cell phone providing for bi-directional communication with a Headphone array; the incorporation of the mobile cell phone's microphone(s) to act as the Environmental Audio Acoustical Transducer(s); and the incorporation of the mobile cell phone's keyboard or touch sensitive screen to function as a manual input or to complement speech commands and that can act in a way to respond to Personalized Services offered to a user.

While the present embodiments have been described with reference to exemplary embodiments, it is to be understood that the claimed embodiments are not limited to the disclosed exemplary embodiments. The scope of the following claims is to be accorded the broadest interpretation so as to encompass all such modifications and equivalent structures and functions.

What is claimed is:

1. A wearable device, comprising:
   a housing for the wearable device;
   an ambient microphone within or on the housing;
   a communication module within or on the housing;
   a logic circuit communicatively coupled to the ambient microphone;
   a memory storage unit communicatively coupled to the logic circuit; and
   an interaction element, the interaction element and logic circuit cooperatively initiate control of media content from the wearable device or initiate operations of the wearable device;
   wherein the logic circuit is configured to cooperatively initiate control of media content of the wearable device in response to analysis of audio captured at the wearable device at the ambient microphone and analyzed at a remote server in response to instructions received from the remote server.

2. The wearable device of claim 1, wherein the interaction element and logic circuit are configured to initiate control of access to the media content played back at the wearable device or mobile device coupled thereto.

3. The wearable device of claim 2, wherein the memory storage unit and logic circuit are remote from the housing.

4. The wearable device of claim 2, wherein the memory storage unit or logic circuit or both are remote from the housing.

5. The wearable device of claim 1, wherein the wearable device comprises eye-wear.

6. The wearable device of claim 1, wherein the interaction element comprises a voice controlled user interface.

7. The wearable device of claim 1, wherein the wearable device further comprises a button with multiple contacts coupled to the logic circuit that forms a portion of the interaction element.

8. The wearable device of claim 1, wherein the initiating of the operations of the wearable device is in response to a trigger of a predetermined alert condition.

9. The wearable device of claim 1, wherein the wearable device comprises an earphone.

10. The wearable device of claim 1, wherein the wearable device comprises at least a portion of a personal computer system, a personal music player system, a personal monitoring system, an automotive audio system, a home audio system, an avionics audio system, a personal video system, a mobile cell phone system, a personal digital assistant system, a standalone accessory, or an advanced eye-wear system with acoustical transducers.

11. The wearable device of claim 1, wherein the wearable device further comprises speaker for providing an audible output.

12. The wearable device of claim 1, wherein the wearable device further comprises a GPS receiver and wherein the communication module forms a peer-to-peer network using location information from the GPS receiver.

13. The wearable device of claim 1, wherein the logic circuit is configured to perform a search of the web in response to a voice command and provide a web search result to the wearable device.

14. The wearable device of claim 1, wherein the logic circuit is configured to cooperatively initiate control of the media content of the wearable device and initiate operations of the wearable device in response to analysis of the audio captured at the wearable device at the ambient microphone and analyzed at the remote server in response to instructions received from the remote server.

15. The wearable device of claim 1, wherein the initiating of operations comprises commercial transactional operations.

16. The wearable device of claim 1, wherein the logic circuit is configured to retrieve specific media content in response to voice commands captured at the wearable device using the ambient microphone, and the wearable device receives results from the remote server in response to speech recognition processing of the voice command at the remote server.

17. The wearable device of claim 1, wherein the wearable device further comprises a presentation device operatively coupled to the wearable device for presenting one or more of text, images, webpages, location information, scheduling information, or audible outputs to complement detected voice commands at the wearable device and speech recognition results received at the wearable device from the remote server in response to analysis of the detected voice commands at the remote server.

18. A wearable device, comprising:
    a housing for the wearable device;
    an ambient microphone mounted on or within the housing;
    a communication module communicatively coupled to the ambient microphone;
    one or more processors communicatively coupled to the ambient microphone;
    a computer readable medium communicatively coupled to the one or more processors and containing instructions which when executed by the one or more processors, cause the one or more processors to perform functions comprising initiating control of audio content or initiating at least one operation of the wearable device; and
    wherein the one or more processors is configured to cooperatively initiate control of media content of the wearable device in response to analysis of audio captured at the wearable device at the ambient microphone and analyzed at a remote server in response to instructions received from the remote server.

19. The wearable device of claim 18, wherein the one or more processors initiates control of the media content in response to a voice command received and processed by a voice controlled user interface, wherein a remote server receives and analyzes the processed voice command and sends results back to the wearable device.

20. A wearable device, comprising:
    a wearable structure having at least an ambient microphone;
    a communication module communicatively coupled to the ambient microphone;
    one or more processors communicatively coupled to the ambient microphone;
    a computer readable medium communicatively coupled to one or more processors and containing instructions which when executed by the one or more processors, cause the one or more processors to perform functions comprising initiating control of audio content accessed at the wearable device in response to detected voice commands in the captured audio; and wherein the one or more processors is configured to cooperatively initiate control of media content of the wearable device in response to analysis of audio captured at the wearable device at the ambient microphone and analyzed at a remote server in response to instructions received from the remote server.

\* \* \* \* \*